Figure 1:
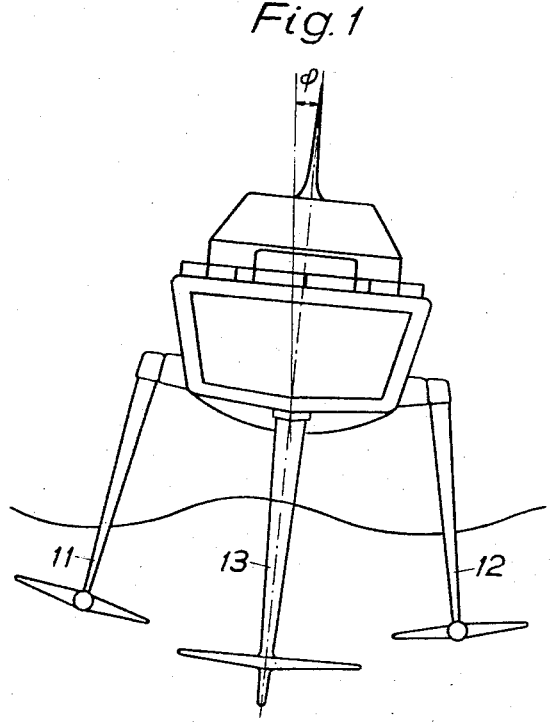

United States Patent Office 3,364,892
Patented Jan. 23, 1968

3,364,892
CONTROL MEANS FOR HYDROFOIL CRAFT
Erik Persson, Vasteras, and Henning Schiott, Skultuna, Sweden, assignors to Allmanna Svenska Elektriska Aktiebolaget, Vasteras, Sweden, a corporation of Sweden
Continuation-in-part of application Ser. No. 440,362, Mar. 17, 1965. This application Oct. 10, 1966, Ser. No. 585,545
6 Claims. (Cl. 114—66.5)

The present invention refers to a control means for hydrofoil craft, preferably of the type which run with fully submerged hydrofoils. This application is a continuation-in-part application of S.N. 440,362, filed Mar. 17, 1965, now abandoned.

In automatic control means of this type, aside from the need for good stability and maneuverability, it is also necessary that the accelerations in the passenger accommodations which occur on account of wave movements are reduced to an acceptable level. It is relatively simple to obtain stability in a calm sea and the principal difficulty is to be able to control the craft during rough seas.

The object of the present invention is to provide a system which gives a smooth ride in a choppy sea. For a craft running with fully submerged foils it is the (absolute) vertical movements of the water adjacent to the foils which causes the vertical accelerations it is desired to avoid. The vertical acceleration is proportional to the foil lift force, which is approximately proportional to the angle of attack, which in turn is approximately proportional to the relative vertical water velocity in relation to the foil. The relative water velocity is equal to the difference between the absolute vertical velocity of the water and that of the foil. Variations in the relative velocity, if not counteracted, will produce variations in the vertical acceleration causing discomfort or damage. Variations in the relative velocity may be caused by changes in the absolute water velocity or by changes in the absolute vertical foil velocity.

The known systems measure the angle of attack or, which is equivalent, the vertical acceleration. The measured quantity is also a measure of the relative vertical water velocity. It is used to change the foil or rudder deflection so as to counteract changes in the relative velocity. It is, however, evident that a change in foil deflection causes a change in vertical acceleration which, in general, causes a change in the absolute vertical foil velocity. This change in turn influences the relative water velocity. A closed control loop is therefore formed which has to be very fast if a substantial reduction in discomfort is to be obtained. Due to elasticity in struts and hull it will in practice be difficult and expensive or impossible to obtain stability in this control system. This is the main disadvantage of previous systems.

An open control circuit, that is, one which does not form a closed loop may, however, be made very rapid without encountering stability problems. An object of the present invention is therefore to measure and use as input to our control system a quantity which is not influenced by the vertical acceleration or velocity of the foil. Such a quantity exists, namely the absolute vertical water velocity which is the cause of the vertical accelerations to be counteracted.

The system comprises:

(a) Measuring means to measure the absolute water velocity.

(b) Rudder actuating means which give the foil or rudder a deflection, the magnitude of which is such a function of the absolute water velocity that the relative water velocity (or angle of attack, or vertical acceleration) is kept essentially constant.

The absolute water velocity is not influenced by the accelerations or velocity changes caused by the rudder deflections. The present system, therefore, does not form a closed control loop and may be given a very rapid action. In a simple and very efficient way it makes it possible to keep the vertical accelerations in a choppy sea to a very low value.

The system is especially adapted to be used in conjunction with some kind of relatively slow-acting height control system, several types of which are known per se.

It is not possible to measure the absolute vertical water velocity directly from a moving craft. The present system, therefore, measures the relative vertical water velocity and the absolute vertical craft velocity, the sum of which is the absolute water velocity.

The relative water velocity is obtained by measuring the angle of attack $\alpha$, the horizontal craft velocity (U) and the pitch angle of the foil ($\psi$).

The absolute vertical craft or foil velocity is obtained by measuring the vertical acceleration ($a$) and integrating with respect to time.

All these measuring means are known per se. According to the invention, however, the output signals from the measuring means are combined in a novel manner, namely to give a signal proportional to the absolute vertical water velocity.

In a preferred embodiment the speed component of the water at right angles to the hydrofoil is measured by measuring the angle of attack of the water in relation to the hydrofoil. The measuring device can comprise a probe or the like, provided with two substantially symmetrically placed pressure measuring points, one on the upper side of the probe and one on its under side. The advantages of this measuring device are given below.

Figure 3:
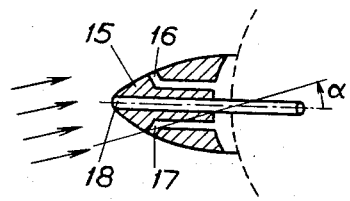
Figure 4:
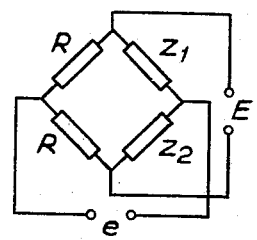
Figure 2:
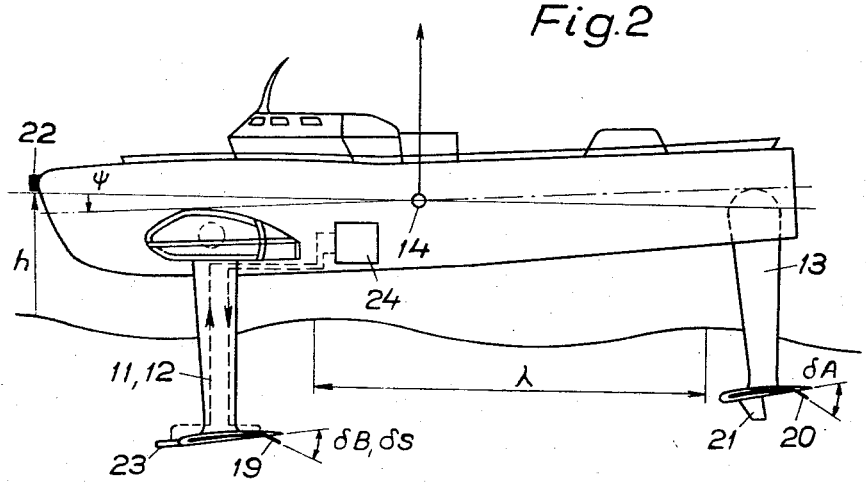
Figure 5:
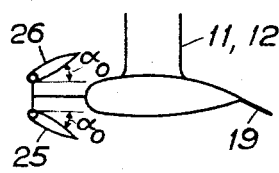
Figure 6:
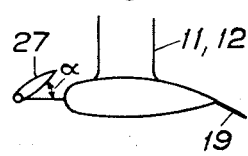
Figure 7:
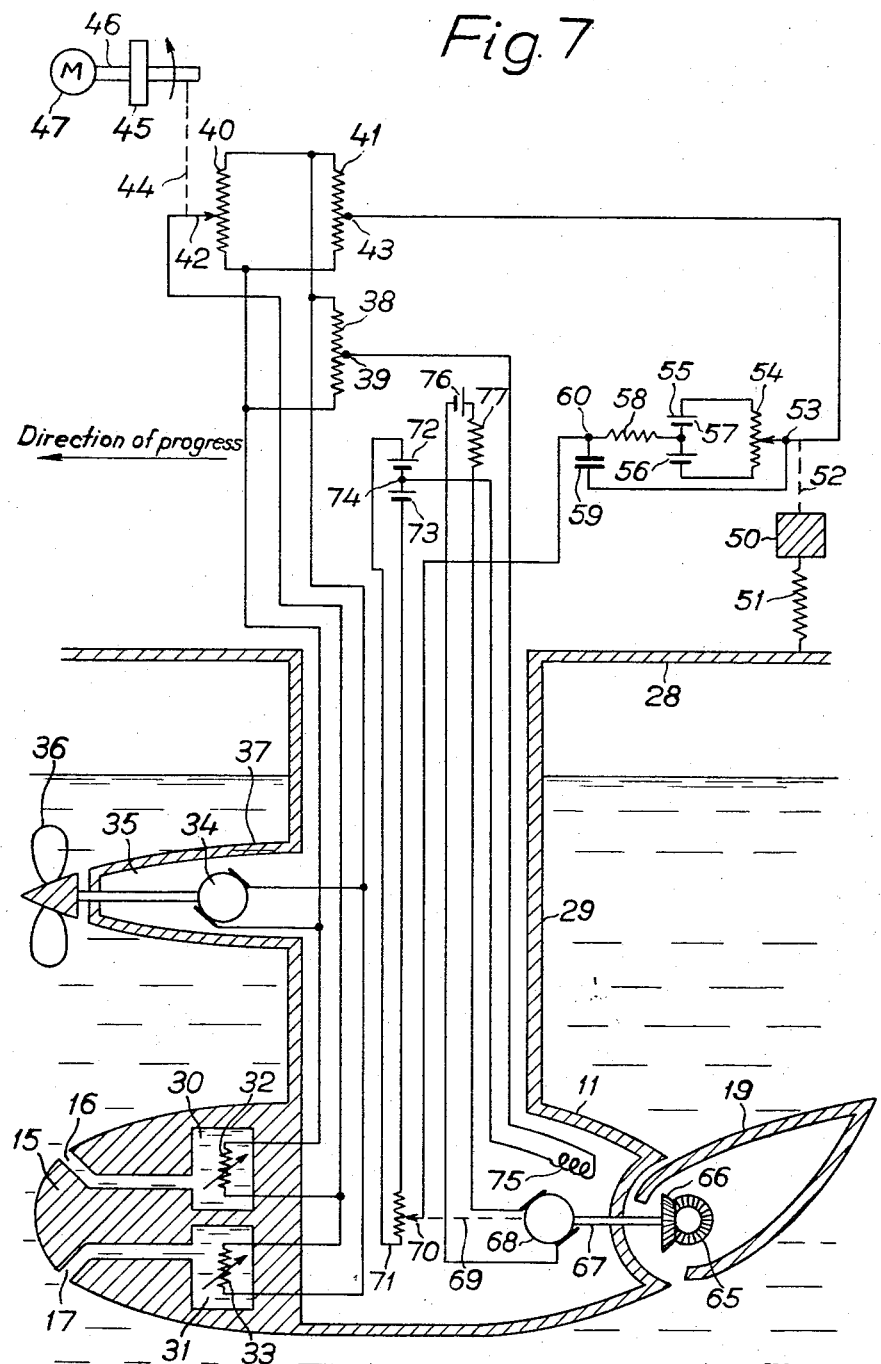

In the accompanying figures FIG. 1 shows a hydrofoil craft with submerged hydrofoil, seen from the front and FIG. 2 the same hydrofoil craft, seen from the side and provided with rudders on the hydrofoil. FIGS. 3 and 4 show a probe for measuring a vertical proportional to the angle of attack to the water and a measuring bridge for calculating said angle respectively. FIGS. 5 and 6 show modifications of the hydrofoil and vane structure. FIG. 7 is a circuit diagram.

FIG. 1 shows a hydrofoil craft with two fronts 11, 12 and one back hydrofoil 13, which when the craft is running are submerged below the surface of the water.

The measuring means 23, which is preferably situated in front of the hydrofoil so as not to be disturbed thereby, is connected to the rudder activating means 24, which is connected to the rudder 19.

The speed component of the water at right angles to the hydrofoil, in this case vertical speed, can be determined according to the following:

$\alpha$ = angle of attack
U = craft velocity
$U_v$ = vertical speed of the water
$\psi$ = angle between the hydrofoil and the horizontal plane (see FIG. 2)
$a$ = vertical acceleration of the hydrofoil
$v$ = vertical speed of the hydrofoil The hydrofoil is connected to be parallel to the horizontal reference plane of the craft. If the hydrofoil is tiltable, $\alpha$ is measured with reference to the neutral position of the hydrofoil.

Then the following is obtained:

$$\tan (\alpha - \psi) = \frac{U_v}{U} - \frac{v}{U}$$

from which for small values of $(\alpha - \psi)$ the desired magnitude results:

$$U_v = (\alpha - \psi) \cdot U + v = (\alpha - \psi) \cdot U + \int a \cdot dt$$

$\psi$ and $a$ can be measured with conventional transmitters, such as a gyro 14 with electrical measuring devices connected to it and an accelerometer respectively, and in order to obtain $U_v$ it thus remains to measure the angle of attack $\alpha$.

A means for measuring this is shown in FIG. 3. It consists of a probe situated in the vicinity of one or several of the hydrofoils and directed in the longitudinal direction of the vessel. It is suitably placed at a point on the hydrofoil where the water flow is undisturbed. The probe 15 which is to measure the angle of attack of the water on the hydrofoil is streamlined and provided with two symmetrically placed outlets, one, 16, above the summetry plane and one, 17, below that plane. For the pressure $P_1$ and $P_2$ in the outlets 16 and 17 the following is valid:

$$\frac{p_1 - p_2}{p_1 + p_2} = \text{constant} \cdot \tan \alpha \text{ or for small } \alpha = \text{constant} \cdot \alpha$$

The measurement of $$\frac{p_1 - p_2}{p_1 + p_2}$$

can suitably be carried out by means of the device according to FIG. 4. The pressures $p_1$ and $p_2$ are transformed in a suitable way known in itself to vary the impedance proportionally of impedances $z_1$ and $z_2$, connected in a bridge according to FIG. 4, with resistances R and R supplied by source E (of E volts) and giving an outlet voltage $e$.

$$e = \frac{E}{2} \cdot \frac{z_1 - z_2}{z_1 - z_2} = \text{constant} \cdot \frac{z_1 - z_2}{z_1 + z_2}$$

Suitable transducers for converting a pressure change to an impedance change are known from the German Patent 715,232 or the Germany published application DAS 1,110,892 (indictance change) or from "Ingenjörshandboken," part 1, pages 482, 486 (Nordisk Rotogravyr, Stockholm 1947), which shows transducers for converting a pressure change into a change of either resistance, capacitance or inductance, and also the bridge connection of FIG. 4 (page 486, FIG. 9/19). A carbon microphone is a transducer of this kind.

Differential pressure measuring devices may of course also be used to measure the difference $p_1 - p_2$. To obtain a signal which is proportional to $\tan \alpha$, this difference must as shown above be divided by the sum $p_1 + p_2$. The pressure measured at point 18 on the probe 15 is proportional to this sum.

The signal thus produced which is proportional to $U_v$ is added to the control signal which is fed from the control device of the craft to the three rudders 19 and 20 which are placed on the hydrofoils 11, 12 and 13 and which in the cases shown are placed at the angles $\sigma_B$, $\sigma_S$, $\sigma_A$, relative to the plane of symmetry.

Instead of the measuring probe according to FIG. 3, a vane can be used which is connected to the hydrofoil in such a way that the force or moment in the connection between the vane and the hydrofoil is measured. With this device the force or moment becomes proportional to $\alpha$ and $U^2$. Dependence on $U^2$ can be avoided if, as in FIG. 5, two vanes 25 and 26 inclined at an angle of $+\alpha_0$ and $-\alpha_0$ respectively in relation to the hydrofoil are used. If the forces measured are $F_1$ and $F_2$ the following will be the case for small $\alpha$.

$$\frac{F_1 - F_2}{F_1 + F_2} = \text{constant} \cdot \alpha$$

$$\frac{F_1 - F_2}{F_1 + F_2}$$

can be obtained by means of a bridge connection according to FIG. 4.

The vane (or vanes) according to the above is fixed relative to the hydrofoil. The vane can also be made freely movable and its angular displacement relative to the hydrofoil becomes $\alpha$. In FIG. 6 this alternative is shown. The vane 27 is freely movable and forms an angle $\alpha$ with the plane of the hydrofoil.

Measuring devices and rudders can be placed on all hydrofoils or only on some of these.

FIG. 7 shows the first measuring means for measuring the angle of attack ($\alpha$) of the hydrofoil (15, 16, 17, 30, 31, 32, 33, 38, 39); the second measuring means responsive to the angle ($\psi$) between the plane of the hydrofoil and the horizontal plane (40, 41, 42, 43, 44, 45, 46, 47); the third measuring means responsive to the vertical acceleration ($a$) of the hydrofoil (50, 51, 52, 53, 54, 55, 56, 57, 58, 59, 60); the fourth measuring means responsive to the speed (U) of the craft 34, 35, 36, 37); and the rudder actuating means (65, 66, 67, 68, 69, 70, 71, 72, 73, 74, 75, 76, 77). All these means are old and well known per se.

The first measuring means comprises a probe 15, suitably placed at the front end of the hydrofoil 11. The chambers 30 and 31 are connected to ports 16 and 17, which are symmetrically placed in relation to the horizontal plane of symmetry of the foil. The pressure transducers 32 and 33 are shown as resistors, the resistance of which varies with the surrounding pressure, but they could equally well be of other known kinds. The transducers are connected in series with each other and their connection point is connected to the movable contact 42 of a resistor 40. The series connected transducers are connected across a D.C. voltage source 34, the voltage of which is proportional to the speed U of the craft. Across the same source a resistor 38 is connected, which resistor has a center-tap 39. As shown in the description of FIGS. 3 and 4, the voltage between points 39 and 42 will be approximately proportional to $U \cdot \alpha$.

The second measuring means comprises a gyroscope and a resistance bridge. The gyroscope is schematically shown as a fly wheel 45 rotating around the axis 46 and driven by a motor 47. The gyroscope is mounted so as to be able to rotate freely around a horizontal axis perpendicular to the longitudinal axis of the craft and will therefore be stationary in space regardless of the pitch angle of the craft. The axis 46 is mechanically connected by means of a link 44 to the movable contact 42 of resistor 40 which is fixed in the craft. Resistors 40 and 41, the latter having a center-tap 43, are connected in parallel across voltage source 34. The voltage between points 42 and 43 will be approximately proportional to the angle ($\psi$) between the hydrofoil and the horizontal plane and to the supply voltage and therefore to the magnitude $U \cdot \psi$.

The third measuring means comprises a mass 50 connected by means of a spring 51 to the body 28 of the craft. The vertical deflection of mass 50 is proportional to the vertical acceleration $a$ of the craft. The mass 50 is connected by means of a mechanical link 52 to the movable contact 53 of a resistor 54, which is connected across a voltage source (55, 56) with a center-tap 57. The voltage between points 53 and 57 will be proportional to the vertical acceleration $a$. This voltage is integrated by means of a resistor 58 and a capacitor 59, and the voltage between points 53 and 60 is proportional to the time integral of the acceleration ($\int a dt$).

The fourth measuring means comprises a D.C. generator 34 driven by shaft 35 from a propeller 36. The speed of the propeller is proportional to the speed (U) of the craft and, as the generator has a constant excitation its output voltage is also proportional to the speed (U). The propeller is mounted on a projection 37 from the strut 29.

The rudder actuating means comprises an electric D.C. motor 68 connected to the rudder 19 by means of bevel gears 65 and 66 and shaft 67. The motor is supplied with a constant armature current from a D.C. voltage supply 76, by means of a resistor 77. The motor torque is then proportional to the current through the field coil 75 of the motor. The motor is connected to the movable contact 70 of resistor 71 by means of a mechanical link 69 in such a way that the displacement of the contact 70 is proportional to the angular displacement of the motor and of the rudder 19. Resistor 71 is connected across a voltage source (72, 73) a center-tap (74) of which is connected to one end of coil 75, the other end of the coil being connected to center-tap 39 of resistor 38.

If polarities, constants and reference directions are suitably selected, the voltage between points 39 and 42 is proportional to $U \cdot a$, that between points 42 and 43 to $U \cdot \psi$, that between points 53 and 60 to $\int a \cdot dt$, that between points 60 and 74 to the angular displacement $\delta$ of the rudder. The field winding 75 of the motor 68 is connected between points 39 and 74 and is energized by a voltage proportional to the sum $$U \cdot \alpha - U \cdot \psi + \int a \cdot dt - \text{const} \cdot \delta$$

The motor will move the flap until this sum is zero, that is until $$U_v = U \cdot \alpha - U \cdot \psi + \int a \cdot dt = \text{const} \cdot \delta$$

The flap will therefore, if the measuring and flap actuation system is fast, at each moment, have a deflection which is proportional to the absolute vertical water velocity $U_v$. The proportionality constant is chosen so that the acceleration caused by the flap deflection is equal to and opposed to the acceleration caused by the absolute water movement.

In the manner shown the motor 68 is therefore actuated by the voltage between the points 39 and 42. That this voltage is proportional to $U \cdot \alpha$ is easily shown. Let the angles between the planes of the orifices 16 and 17 and the centre line of the foil be $\beta$. Let the angle of attack be $\alpha$. Then $$p_1 = \frac{\rho v^2}{2} \sin(\beta + \alpha)$$

$$p_2 = \frac{\rho v^2}{2} \sin(\beta - \alpha)$$

where $\rho$ is the density of the water.

The bridge formed by resistors 38 and 40 is supplied by a voltage proportional to the craft speed $U$. The output from the bridge is consequently proportional to $$\frac{U}{2} \cdot \frac{z_1 - z_2}{z_1 + z_2}$$

where $z_1$ and $z_2$ are the impedances of transducers 32 and 33. These impedance may, at least in the first approximation, be made proportional to $p_1$ and $p_2$. The bridge output (the voltage between points 39 and 42) will therefore be proportional to $$\frac{U}{2} \cdot \frac{p_1 - p_2}{p_1 + p_2} = \frac{U}{2} \cdot \frac{\sin(\beta+\alpha) - \sin(\beta-\alpha)}{\sin(\beta+\alpha) + \sin(\beta-\alpha)} =$$

$$\frac{U}{2} \cot \beta \tan \alpha \approx \text{const.} \ U \cdot \alpha$$

Each of the means shown and described may of course be exchanged for other equivalent means, known per se.

The device can be varied in different ways, only a few of which are shown, within the scope of the following claims.

We claim:

1. Control means for hydrofoil craft, said control means comprising at least one rudder at least a part of which is tiltable, a rudder actuating means connected to said rudder to adjust the rudder, a first measuring means measuring the angle of attack ($\alpha$) of the hydrofoil, a second measuring means responsive to the angle ($\psi$) between the plane of the hydrofoil and the horizontal plane, a third measuring means responsive to the acceleration ($a$) of the hydrofoil in a vertical direction and a fourth measuring means responsive to the speed (U) of the craft, means to combine the output signals from all said measuring means to give a resultant signal ($U_v$), corresponding to the absolute vertical velocity of the water and means to supply the resultant signal to said rudder actuating means, said combining means producing signals of a value $$U_v = (\alpha - \psi) \cdot U + \int a \cdot dt$$

2. Control means as claimed in claim 1, said first measuring means comprising a probe, said probe comprising pressure measuring means for measuring the pressure at two points on said probe, said points being essentially symmetrically placed with respect to the axis of said probe, one point being situated on the upper side of said probe, the other point being situated on the lower side of said probe.

3. Control means as claimed in claim 2, said pressure measuring means including means to transform the pressure in said two points into a first impedance ($z_1$) proportional to the pressure in the point on the upper side of said probe and a second impedance ($z_2$) proportional to the pressure at the point on the lower side of said probe, said impedances being connected in a measuring bridge means, said bridge means including means to produce an output signal from said bridge which is proportional to $$\frac{z_1 - z_2}{z_1 + z_2}$$

whereby said last mentioned output signal will be proportional to the tangent of the angle of attack ($\alpha$).

4. Control means as claimed in claim 1, said first measuring means comprising a vane attached to said hydrofoil, said first measuring means also comprising a sensing element connected to said vane and arranged to measure the forces influencing said vane.

5. Control means as claimed in claim 4, said first measuring means comprising two vanes attached to said hydrofoil, one of said vanes being deflected upwards so as to make a certain angle with the hydrofoil, the other vane being deflected downwards so as to make the same angle with the hydrofoil, sensing elements connected to said vanes, means to combine the output signal ($F_1$) from the sensing element connected to said first mentioned vane with the output signal ($F_2$) from the sensing element attached to said last mentioned vane to produce a signal $$\frac{F_1 - F_2}{F_1 + F_2}$$

whereby a signal proportional to the angle of attack ($\alpha$) is obtained.

6. Control means as claimed in claim 1, said first measuring means comprising a freely movable vane attached to said hydrofoil, and means measuring the deflection of said vane relative to said hydrofoil, the output signal from said last mentioned measuring means corresponding to the angle of attack ($\alpha$).

References Cited

UNITED STATES PATENTS

| | | | |
|---|---|---|---|
| 2,626,115 | 1/1953 | Atwood et al. | 244—82 X |
| 3,156,209 | 11/1964 | Ask | 114—66.5 |
| 3,209,714 | 10/1965 | Bowles | 114—66.5 |

ANDREW H. FARRELL, *Primary Examiner.*